Figure 1:
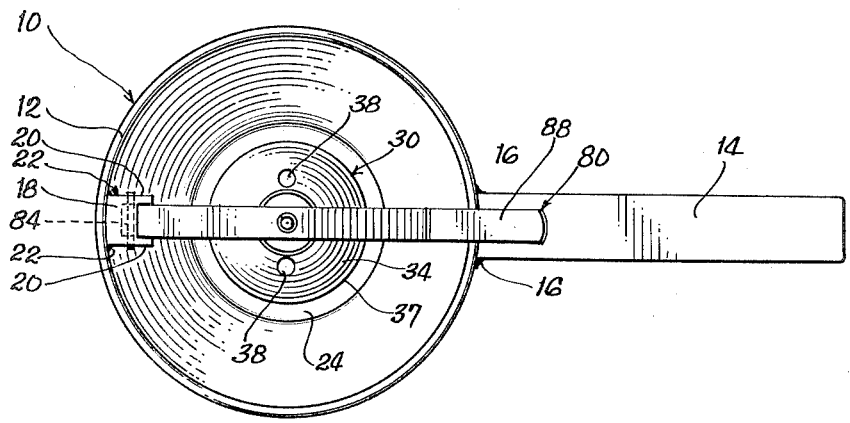

Aug. 18, 1964

L. J. MARTINO ETAL 3,144,968

FLUID DISPENSER

Filed Oct. 11, 1962

2 Sheets-Sheet 1

LOUIS J. MARTINO
WAYNE E. MOLL
RALPH E. WEIMER
INVENTORS

BY Horton, Davis,
Brewer and Brugman
Att'ys

Aug. 18, 1964
L. J. MARTINO ETAL
3,144,968
FLUID DISPENSER
Filed Oct. 11, 1962
2 Sheets-Sheet 2
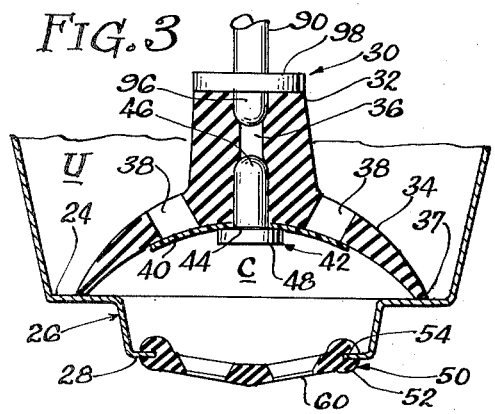
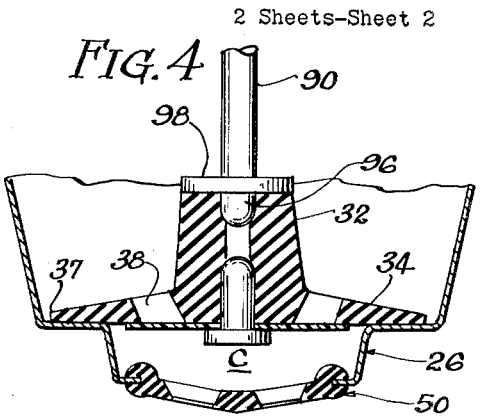
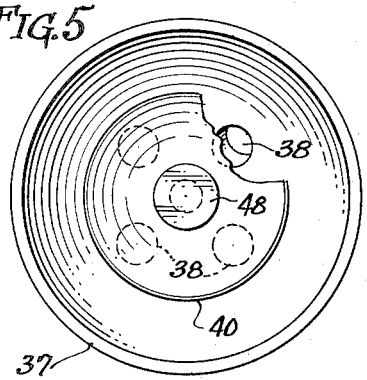
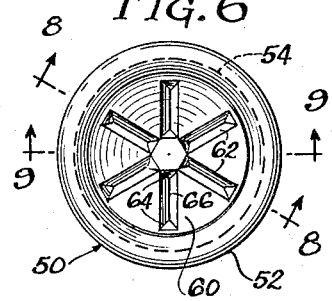
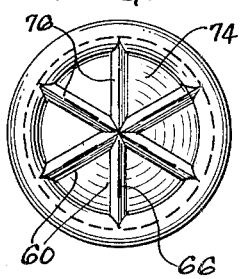
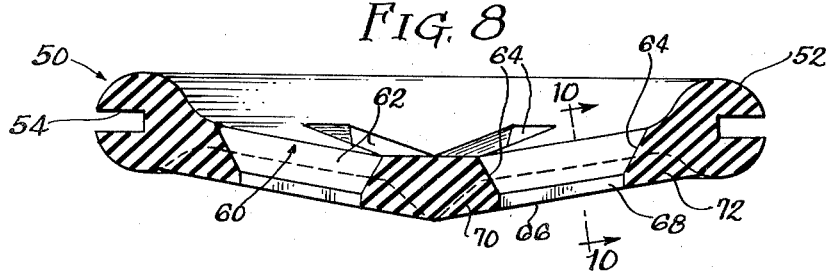
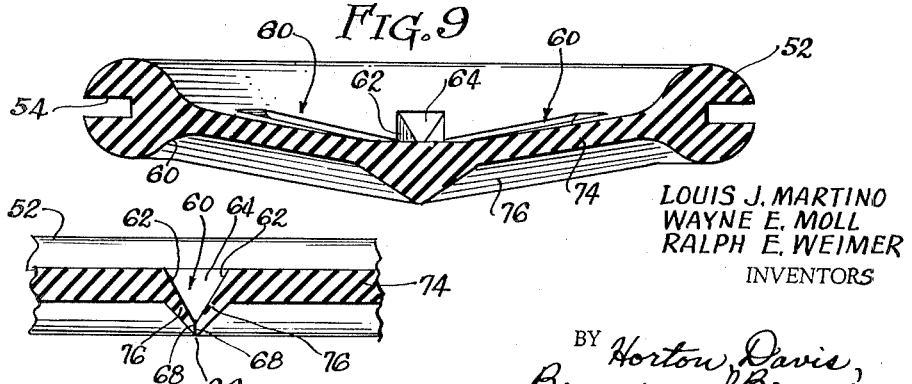
LOUIS J. MARTINO
WAYNE E. MOLL
RALPH E. WEIMER
INVENTORS
BY Horton Davis,
Brewer and Brugman
Attys United States Patent Office 3,144,968
Patented Aug. 18, 1964

3,144,968
FLUID DISPENSER
Louis J. Martino, Lombard, Wayne E. Moll, Villa Park, and Ralph E. Weimer, Lombard, Ill., assignors to McDonald's Systems, Inc., Chicago, Ill., a corporation of Illinois
Filed Oct. 11, 1962, Ser. No. 229,821
7 Claims. (Cl. 222—380)

This invention relates to dispensers, particularly dispensers for condiments, which are adapted to distribute fluids in a predetermined pattern over an object such as a hamburger.

This invention is concerned with condiment dispensers which are easily handled and manipulated to dispense predetermined quantities of a fluid rapidly and repeatedly.

This invention is particularly concerned with portable dispensers which are easily handled and manipulated with a single hand to dispense predetermined quantities and patterns of a fluid rapidly and repeatedly.

Especially in high volume food dispensing operations, such as drive-in restaurant operations, it is necessary to provide simple efficient implements for use in the various stages of processing of foodstuffs. One such step is the dispensing of a controlled amount of a condiment, such as mustard or catsup, onto hamburgers or hamburger buns. Speed and accuracy of dispensing are necessary, from the point of view of the cost of the condiments as well as from the cost of labor viewpoint. So also is it desirable to enable the operator to use a single hand to carry out the dispensing operation while his other hand is performing another step.

The novel condiment dispenser of this invention provides all of those advantages. It also is easily and rapidly dismantled into its component parts which facilitates its rapid and complete cleaning, also a desirable attribute when foodstuffs are being handled, and sanitation is a prime consideration.

It is therefore an object of this invention to provide a dispenser having novel means for controlling accurately, upon repeated rapid operation, the quantity of fluid to be dispensed and for controlling the pattern in which the fluid is dispensed.

Further an object of this invention is the provision, in a fluid dispenser, of novel means defining a deformable chamber which facilitates controlling the amount of fluid to be dispensed.

Also an object of this invention is the provision of a novel resilient diffuser valve suitable for use in a condiment dispenser, through which valve fluid may pass in one direction, but which is adapted to be shut off and prevent reverse flow.

Figure 2:
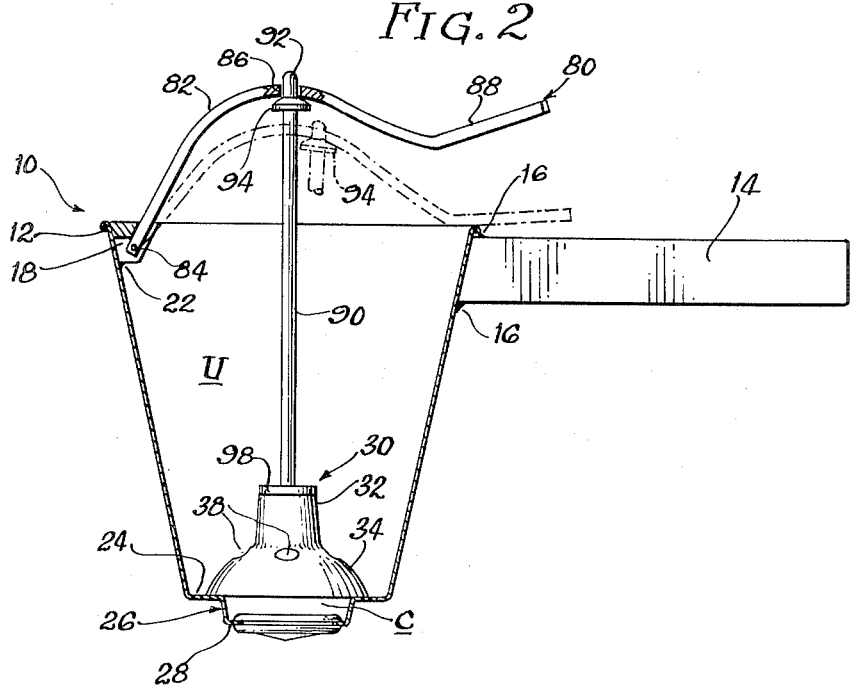

Further objects and advantages of this invention will become apparent from the following description and drawings which illustrate a presently preferred embodiment of my invention. The several views illustrating that preferred embodiment are:

FIG. 1 is a plan view of a dispenser of this invention;
FIG. 2 is a side view, partially in section, of the dispenser of FIG. 1, showing part of the pumping mechanism in phantom;
FIG. 3 is an enlarged view, partially in section, of the lower portion of the dispenser of FIG. 1;
FIG. 4 is an enlarged view, partially in section, of the lower portion of the dispenser of FIG. 1 after the dispensing stroke has been completed;
FIG. 5 is a bottom view of the plunger and flapper valve assembly;
FIG. 6 is an enlarged plan view of the diffusor valve;
FIG. 7 is an enlarged bottom view of the diffusor valve;
FIG. 8 is a sectional view of the diffusor valve taken substantially along line 8—8 of FIG. 6;
FIG. 9 is a sectional view of the diffusor valve taken substantially along line 9—9 of FIG. 6; and
FIG. 10 is a partial sectional view taken substantially along line 10—10 of FIG. 8.

Since the dispenser will be described in connection with its use as a dispenser of foodstuffs such as catsup and mustard, the materials of construction suggested will be stainless steel and white neoprene, materials which meet accepted sanitary standards. However the invention is not limited to the use of such materials nor is the dispenser limited to use in the dispensing of foodstuffs.

First referring to FIGS. 1 and 2, the dispenser is shown as comprising a stainless steel shell 10 of generally conical shape. The upper edge of shell 10 terminates in a rounded bead 12. Adjacent bead 12 a stainless steel handle 14, generally rectangular in cross section, is connected to shell 10 by welds 16. A stainless steel pivot block 18 having spaced inwardly extending arms 20 is connected by welds 22 to the upper interior edge of shell 10 diametrically opposed to the point at which handle 14 is connected to the shell.

The bottom of shell 10 is provided with a flat generally radially disposed annular floor 24. The inner edge of floor 24 terminates in an annular flange 26. Annular flange 26 is provided with a generally radially disposed inwardly extending annular edge 28.

The pumping mechanism of the condiment dispenser includes a resilient plunger 30 having an elongated tapered head portion 32 and a concave pump portion 34. Plunger 30 is formed of neoprene or a similar rubber-like material. The head portion 32 is provided with a cylindrical central bore 36 for purposes to be described.

The pump portion 34, as best seen in FIGS. 3 and 4, has a cross section of gradually diminishing thickness as the peripheral edge 37 is approached. Peripheral edge 37 of the plunger is seated throughout on annular floor 24 and the diameter of plunger 30 and the width of the annular floor are proportioned so that peripheral edge 37 will rest on floor 24, thereby preventing unwanted flow from the upper portion of the shell into the chamber "C." A plurality of openings 38 are provided in the pump portion adjacent the head portion 32 of plunger 30. These openings 38 connect the interior of a chamber "C" with the contents of the upper section "U" of shell 10.

As illustrated in FIG. 3, plunger 30 includes a flapper valve 40 generally circular in shape. The connection between the valve 40 and the plunger 30 is a removable one and is made by a retainer pin 42 which passes through an opening 44 in the center of flapper valve 40. Pin 42, which may be made of nylon, includes a shank 46 adapted to pass through opening 44 and into central bore 36 of plunger 30. Since it is of a greater diameter than bore 36, shank 46 is gripped and retained by head portion 32. Head 48 of pin 42 limits the depth to which shank 46 may penetrate bore 36, and being of greater diameter than opening 44 urges flapper valve 40 against the lower surface, the chamber side, of plunger 30.

Since flapper valve 40 is preferably of white neoprene or a similar rubber-like material, its resiliency causes it to conform to and remain in close contact with the lower surface of pump portion 34 so that it prevents the flow of fluid through openings 38 when the upper portion "U" of shell 10 is filled with fluid.

Seated on edge 28 of flange 26 is a disc-like diffusor valve 50, which is also somewhat conical in shape as is best seen in FIGS. 8 and 9. It is provided with a peripheral bead 52 at its edge, the bead defining circumferential slot 54, rectangular in cross section. The bead and the slot are proportioned so that diffusor valve 50 will grip and be seated on flange edge 28.

As is apparent, particularly from FIGS. 3 and 4, chamber "C" in the embodiment illustrated, is bounded by the plunger 30 (and its associated flapper valve 40) and by the diffusor valve 50, as well as by certain minor segments of the floor 24 and flange 26. In this embodiment floor 24 and flange 26 serve to locate and support the chamber forming elements plunger 30 and diffusor valve 50.

Diffusor valve 50 may be molded or formed from white neoprene or any other similar resilient rubber-like material which will meet the requisite sanitation standards and resiliency requirements.

Diffusor valve 50 includes, in the embodiment shown, an array of six valve elements 60 radially disposed like the spokes of a wheel. Valve elements 60 are spaced inwardly of the center of valve 50, and extend radially outwardly of the center a disance less than the distance to bead 52.

When viewed from the top or chamber side of the diffusor valve 50, as in FIG. 6, valve elements 60 are seen as elongated V-shaped troughs or depressions having converging generally radially disposed sides 62 and converging generally circumferentially disposed sides 64. The radial sides 62 of each valve element 60 meet in a line which is coincident with a slit 66. Slits 66 extend from the inside bottom of the V-shaped troughs downwardly through diffusor valve 50 and terminates at the outer or lower surface of diffusor valve 50 at the apices of complementary V-shaped ridges. Thus slits 66 are bounded by two facing generally rectangular surfaces 68 which must be spread to allow anything to pass downwardly and outwardly of diffusor valve 50.

When viewed from below, as in FIG. 7 valve elements 60 are seen as elongated V-shaped ridges extending downwardly of the valve portion, the apices of said ridges being coincident with slits 66. In that respect see FIG. 10. So also does FIG. 9 illustrate the fact that certain portions of diffusor valve 50, particularly portions 70 and 72 radially inwardly and radially outwardly of the valve elements respectively, are of greater thickness than segments 74 of the valve, the segments between the valve elements. Portions 70 and 72 are also of greater thickness than the converging walls 76 of the valve elements 60. Those converging walls 76 meet in the rectangular surfaces 68 which define slits 66.

The pumping mechanism of this invention is actuated by actuating lever 80. Lever 80 includes a generally arcuate section 82 and is bored to permit pivot pin 84 to pass through one end so that lever 80 may be pivotally connected to pivot block 18 between arms 20 thereof. Arcuate section 82 is provided with a circular opening 86 near its center, for a purpose to be described. Actuating lever 80 terminates at its other end in a trigger section 88, the major portion of which overlies handle 14, as is best seen in FIGS. 1 and 2.

A plunger rod 90 is disposed between actuating lever 80 and plunger 30. Plunger rod 90 includes upper rounded end 92 which is adapted to be seated in opening 86 in lever 80. To limit the extent to which end 92 may penetrate lever 80, a press fit collar 94 is disposed on rod 90.

At the other end of plunger rod 90, lower end 96 is disposed inwardly of central bore 36. To limit the extent to which it may penetrate bore 36, a lower collar 98, press fit on plunger rod 90, is adapted to be seated against the upper surface of the plunger head portion 32.

In operation, the upper section "U" of shell 10 is filled with a condiment such as catsup or mustard, handle 14 is gripped and actuating lever 80 is depressed by the operator, trigger 88 being conveniently depressed by the operator's thumb. A predetermined amount of the condiment is discharged during the downward stroke of lever 80 through diffusor valve 50 in a pattern determined by the spacing and disposition of valve elements 60, that being, in the embodiment illustrated, in a pattern much like the spokes of a wheel.

More fully to appreciate the embodiment of the invention described herein, one cycle of operation of the dispenser will be described in detail. It is to be understood that at least one cycle will have already been completed so that chamber "C" will contain a measured quantity of condiment.

The operator grips handle 14 and with his thumb depresses trigger 88. The arcuate section 82 of actuating lever 80 moves downwardly (and to the right as seen in FIG. 2). As arcuate section 82 moves downwardly, plunger rod 90 is depressed, that in turn depressing head portion 32 of plunger 30. Pump portion 34 of plunger 30 is depressed and deformed, its peripheral edge 37 moving radially outwardly along floor 24. Because the openings 38 in plunger 30 are sealed off by flapper valve 40 and because a seal exists between peripheral edge 37 of pump portion 34 of plunger 30 and floor 24 of shell 10, as the pressure developed in chamber "C" increases when the volume of the chamber decreases, the rectangular surfaces 68 defining slits 66 spread and the condiment in chamber is ejected in the pattern which slits 66 describe.

When the downward stroke has been completed as is shown partially in phantom in FIG. 2 and partially in FIG. 4, the trigger is released and resilient pump portion 34 of plunger 30 begins to return resiliently to its original shape, thereby reducing the pressure in chamber "C" to less than atmospheric. Because of the vacuum created, rectangular surfaces 68 are drawn together thereby preventing air from entering chamber "C" through slits 66. The difference between the reduced pressure in chamber "C" and atmospheric pressure in the body of condiment in upper shell portion "U" causes flapper valve 40 to withdraw from its close contact with the inner surface of plunger 30 allowing condiment to pass through openings 38 into chamber "C." When the pressures have equalized, flapper valve 40 again closes off openings 38. The fluid generally distributes itself evenly over the entire upper surface of the diffusor valve.

In light of the foregoing description, it is apparent that the outer diameter of plunger 30 at its peripheral edge 37 and the width of floor 24 should be proportioned so that the peripheral edge 37 of the plunger will always rest on the floor regardless of where the plunger is located in the bottom of the shell. It is also apparent that in the embodiment described the plunger 30 should be resilient enough to cause the actuating lever to return to its position of rest when the trigger is released.

The amount of condiment to be dispensed on each cycle of operation of the dispenser can be controlled in several ways. The shape and size, and particularly the concavity, of the pump portion 34 of plunger 30 will determine in large measure the relative changes in volume of chamber "C." That tends to control the volume of condiment drawn in through openings 38, hence the amount dispensed in each cycle. So also does the length of the stroke of plunger rod 90 tend to control the degree of deformation and change in shape of plunger 30, hence the change in volume of chamber "C." Such adjustments, however, are within the province of those skilled in the art once the invention and embodiment thereof which are described herein, are understood.

To dismantle the dispenser for cleaning or for replacement of parts, if replacement becomes necessary, the upper end 92 of plunger rod 90 should be withdrawn from opening 86. Then lower end 96 may be removed from central bore 36 of plunger 30. Plunger 30 may be lifted out of shell 10 where it can be separated from flapper valve 40 by retracting shank 46 of pin 42 from central bore 36. Finally diffusor valve 50 can be removed from flange edge 28 by retracting bead 52 from its flange gripping position. Once cleaned the parts can be reassembled easily and rapidly.

While the embodiment described has been illustrated as a hand held dispenser fabricated of certain materials of construction, it is not intended to be so limited. The disclosure herein will make obvious to those skilled in

We claim:

1. A manual fluid dispenser comprising an upstanding shell having an upstanding wall circular in cross section, a handle connected to said shell, a floor near the base of said shell surrounding an opening in the base of said shell, a resilient deformable concave plunger adapted to rest on its peripheral edge on said floor, the wall of said shell restraining said plunger so that said opening is covered for all positions of said plunger, a resilient diffusor valve releasably connected to said shell in said opening in the base of said shell beneath said plunger, said plunger, said shell and said diffusor valve cooperating to form a chamber, said diffusor valve defining at least one slit, said plunger defining a plurality of openings, a resilient flapper valve releasably connected to the chamber side of said plunger and covering said plunger openings, a reciprocatable rod connected to said plunger for deforming said plunger and for reducing the volume of said chamber, and means adjacent said handle for reciprocating said rod, whereby when said rod is reciprocated and said plunger is deformed the flapper valve prevents the escape of the chamber's contents through said openings and the contents of said chamber are dispensed through said slit and when said reciprocating means are released the flapper valve opens to allow a predetermined flow into said chamber as said plunger resiliently returns to its undeformed concave configuration.

2. A sanitary dispenser for dispensing fluid and semi-fluid food products comprising a shell having a continuous wall and having an upper section and a bottom portion, a generally centrally located opening in said bottom portion and a floor in said bottom portion surrounding said generally centrally located opening, a diffusor valve mounted in and closing said opening, said diffusor valve having at least one slit therein, a resilient deformable plunger having a peripheral edge proportioned to be sealingly seated upon said floor thereby to cooperate with said floor and said diffusor valve to define a chamber in said bottom portion of said shell, the continuous wall of said shell restraining said plunger so that said generally centrally located opening is covered for all positions of said plunger, at least one opening in said plunger communicating with said upper section and said chamber in said bottom portion, valve means operatively connected to said plunger for closing said opening in said plunger, and means for deforming said plunger and for reducing the volume of said chamber to discharge the contents of said chamber through said diffusor valve, whereby when said plunger deforming means are operated the contents of said chamber are discharged through said diffusor valve and said plunger valve means prevents the escape of said chamber's contents to said upper section through said plunger opening and whereby when said plunger deforming means are released, said plunger resiliently returns to the position it assumed prior to the operation of said plunger deforming means and said plunger valve means opens to allow a predetermined flow from said upper section of said shell into said chamber.

3. The dispenser of claim 2 wherein said plunger is concave when viewed from the chamber side thereof and said valve means is a resilient disc releasably connected to the chamber side of said plunger.

4. The dispenser of claim 2 wherein said plunger is concave when viewed from the chamber side and said diffusor valve has a plurality of independent slits therein.

5. The dispenser of claim 4 wherein said diffusor valve is formed of a resilient material and defines a plurality of downwardly extending elongated V-shaped depressions having underlying complementary V-shaped ridges extending outwardly of the outer surface of said diffusor valve, the slits extending downwardly from the base of said depressions and terminating at the apices of said ridges.

6. The dispenser of claim 2 wherein said shell has a circular horizontal cross section throughout and wherein said plunger is concave and is unrestrained radially except by said shell, the diameter of said plunger being sufficiently great so that the peripheral edge rests upon said floor and completely surrounds the opening in all of its unrestrained radially displaced positions.

7. The dispenser of claim 2 wherein said plunger deforming means include a reciprocatable plunger rod engaging said plunger and oscillatable actuating means for reciprocating said plunger rod.

References Cited in the file of this patent
UNITED STATES PATENTS

| | | |
|---|---|---|
| 1,048,255 | Winklemiller et al. | Dec. 24, 1912 |
| 1,748,682 | Smith | Feb. 25, 1930 |
| 2,104,990 | Hoefler | Jan. 11, 1938 |
| 2,193,517 | Lindstrom | Mar. 12, 1940 |
| 2,296,861 | Matter | Sept. 29, 1942 |
| 3,062,415 | Anderson | Nov. 6, 1962 |